United States Patent
Itou et al.

(10) Patent No.: US 7,083,542 B2
(45) Date of Patent: Aug. 1, 2006

(54) INTERNAL BICYCLE HUB TRANSMISSION WITH A ONE-WAY CLUTCH FOR A DRIVING MEMBER

(75) Inventors: Minoru Itou, Toyoura-gun (JP); Tetsuya Hino, Shimonoseki (JP)

(73) Assignee: Shimano, Inc., Sakai (JP)

( * ) Notice: Subject to any disclaimer, the term of this patent is extended or adjusted under 35 U.S.C. 154(b) by 36 days.

(21) Appl. No.: 10/707,833

(22) Filed: Jan. 15, 2004

(65) Prior Publication Data

US 2004/0171454 A1 Sep. 2, 2004

(30) Foreign Application Priority Data

Feb. 28, 2003 (EP) .................................. 03004518
Jul. 14, 2003 (EP) .................................. 03016004

(51) Int. Cl.
*F16H 3/44* (2006.01)

(52) U.S. Cl. ........................................ 475/297; 475/269

(58) Field of Classification Search ................ 475/213, 475/269, 270, 296–7, 329
See application file for complete search history.

(56) References Cited

U.S. PATENT DOCUMENTS

| 3,934,493 | A | * | 1/1976 | Hillyer ........................ 475/297 |
| 4,400,999 | A | * | 8/1983 | Steuer ........................ 475/213 |
| 5,882,274 | A | | 3/1999 | Shoge |
| 5,928,103 | A | * | 7/1999 | Shoge ........................ 475/297 |
| 5,964,678 | A | | 10/1999 | Hanada et al. |
| 5,964,679 | A | * | 10/1999 | Matsuo et al. .............. 475/297 |
| 6,558,288 | B1 | * | 5/2003 | Okochi ........................ 475/297 |

FOREIGN PATENT DOCUMENTS

JP 405288248 A * 11/1993 ................ 475/297

* cited by examiner

*Primary Examiner*—Roger Pang
(74) *Attorney, Agent, or Firm*—James A. Deland

(57) ABSTRACT

An internal hub transmission for a bicycle comprises a drive member rotatably supported around a hub axle, a hub body rotatably supported around the hub axle, a planetary gear mechanism disposed in a force transmission path between the drive member and the hub body that communicates rotational force from the drive member to the hub body through a plurality of power transmitting paths, and a clutch member that controls the planetary gear mechanism. A one-way clutch mechanism is disposed in a force transmission path between the drive member and the clutch member.

27 Claims, 4 Drawing Sheets

INTERNAL BICYCLE HUB TRANSMISSION WITH A ONE-WAY CLUTCH FOR A DRIVING MEMBER

BACKGROUND OF INVENTION

The present invention is directed to bicycles and, more particularly, to an internal bicycle hub transmission.

Internal hub transmissions generally comprise a hub axle fixed to a bicycle frame and a hub body rotatably mounted around the hub axle. A planetary gear mechanism is housed within the hub body so that rotational drive force of a drive member driven by the bicycle chain can be communicated to the hub body through various transmission paths. A clutch mechanism including a clutch member is provided for selecting the transmission path, wherein the clutch member may be controlled by axially moving it with a push rod. Such a hub transmission is disclosed in U.S. Pat. No. 5,928,103, wherein additional means are provided to facilitate actuation of the clutch member.

In this conventional hub transmission, the drive member always engages the clutch member regardless of the currently selected gear (e.g., high speed, medium speed or low speed). Thus, when backpedaling, the reverse rotation of the drive member is always accompanied by reverse rotation of the clutch member. Furthermore, when the hub transmission is in high speed, the clutch member and the planet gear carrier are coupled together, so they both rotate in the reverse direction during backpedaling. In any event, backpedaling is not smooth and requires more pedaling effort than desired.

The drive member disclosed in U.S. Pat. No. 5,928,103 is adapted to mount one chain sprocket for engaging the chain. Other hub transmissions have a drive member with an increased axial length so that multiple chain sprockets may be mounted to the drive member. However, when the axial extension of the hub increases to accommodate several sprockets on the outer periphery, additional mechanical loads arise in the drive member. For example, opposite ends of the hub axle are mounted to the bicycle frame, and the bicycle wheel is disposed between these two ends. Thus, the downward weight of the cyclist is supported at the ends of the hub axle while the bicycle wheel produces an upward counteracting force. This, in turn, causes a bending moment and a slight deflection to be applied to drive member. The pedaling force applied to the chain by the rider induces a torsional force in the drive member, thus causing further deflection. These deflections create additional friction and drag, decrease smoothness and increase the required pedaling effort.

SUMMARY OF INVENTION

The present invention is directed to various features of an internal bicycle hub transmission. In one embodiment, an internal hub transmission for a bicycle comprises a drive member rotatably supported around a hub axle, a hub body rotatably supported around the hub axle, a planetary gear mechanism that communicates rotational force from the drive member to the hub body through a plurality of power transmitting paths, and a clutch member that controls the planetary gear mechanism. A one-way clutch mechanism is disposed in a force transmission path between the drive member and the clutch member.

In another embodiment, an internal hub transmission for a bicycle comprises a drive member rotatably supported around a hub axle, wherein the drive member includes a sprocket-supporting portion structured to support at least one sprocket; a first bearing assembly rotatably supporting the drive member on the axle; and a second bearing assembly rotatably supporting the drive member on the hub axle. A hub body is rotatably supported around the hub axle, and a planetary gear mechanism communicates rotational force from the drive member to the hub body through a plurality of power transmitting paths. A clutch member is provided for controlling the planetary gear mechanism.

Additional inventive features will become apparent from the description below, and such features alone or in combination with the above features may form the basis of further inventions as recited in the claims and their equivalents.

DETAILED DESCRIPTION

Figure 1:
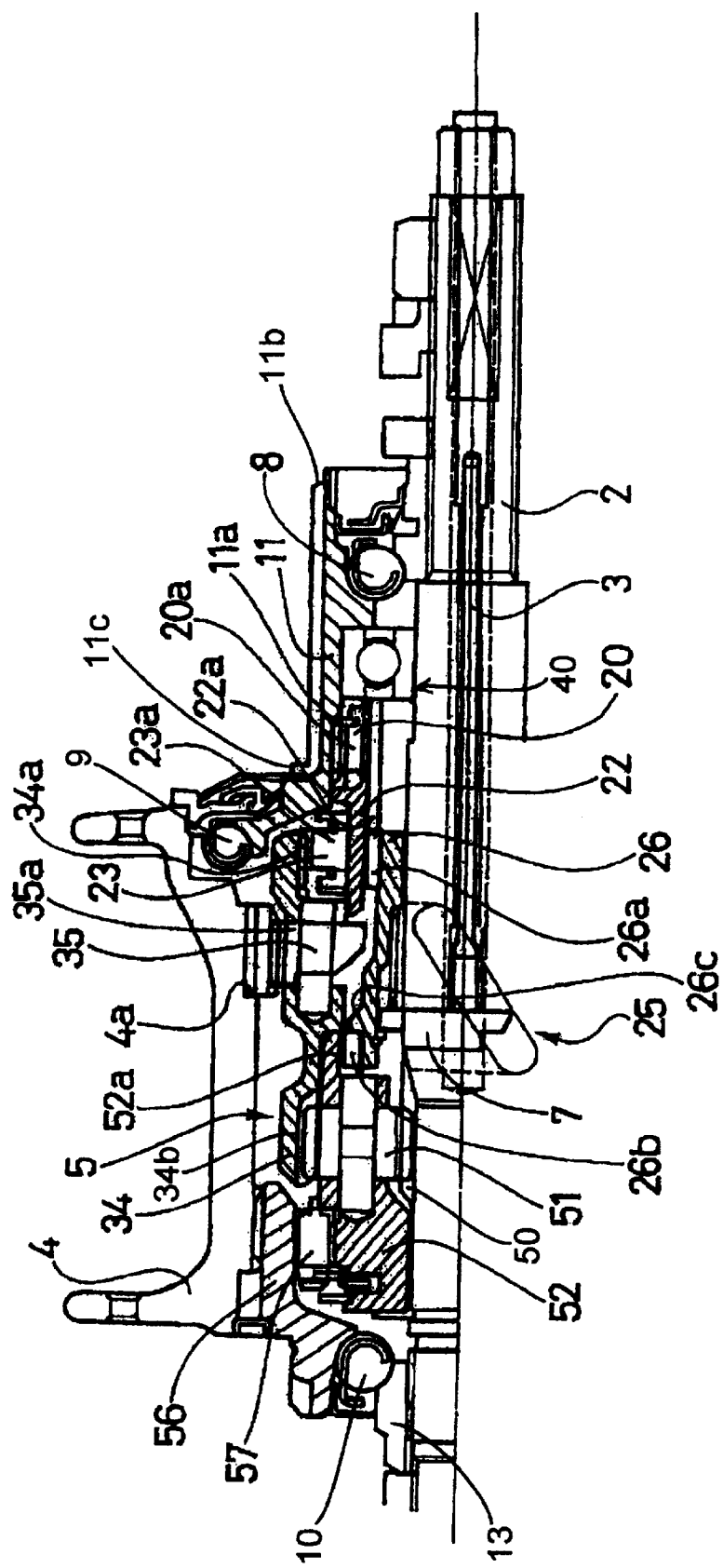
FIG. 1 is a cross-sectional view of an embodiment of a hub transmission in a high speed state.

FIG. 1 is a cross-sectional view of an embodiment of a hub transmission in a high speed state. The hub transmission includes a hub axle 2 adapted to be fixed to the rear dropouts (not shown) of the bicycle frame. A drive member 11 is rotatably mounted around the right end of hub axle 2, a hub body 4 is rotatably mounted around hub axle 2, and a planetary gear mechanism 5 is housed inside hub body 4. A clutch control mechanism 25 selects the power transmission path through planetary gear mechanism 5 by axially adjusting a clutch member 26.

Hub axle 2 is a cylindrical member with a larger diameter center portion and smaller diameter end portions, and it is provided with a central bore for receiving a control rod 3 therein. An actuator means (not shown) controlled by a shift control cable is disposed at the right end of hub axle 2 for axially moving control rod 3. Axial movement of control rod 3 is transmitted to a shift key 7 that extends through an axial groove of hub axle 2, wherein shift key 7 transmits the axial movement to clutch member 26. The axial position of clutch member 26 selects the force transmission path through planetary gear mechanism 5.

In this embodiment, drive member 11 is rotatably supported on hub axle 2 by a ball bearing assembly 8 located at an outer end region 11b of drive member 11 and by a bearing assembly 40 located axially inwardly of bearing assembly 8, wherein bearing assembly 8 contacts a hub cone 41 mounted at the right end of hub axle 2. Bearing assembly 40 will be discussed in more detail below. Hub body 4 is rotatably supported on hub axle 2 by ball bearing assemblies 9 and 10, wherein bearing assembly 9 contacts an inner end of drive member 11, and bearing assembly 10 contacts a hub cone 13 mounted at the left end of hub axle 2. A hub cap 56 is fixed to the left side of hub body 4.

Planetary gear mechanism 5 comprises a sun gear 50 formed on hub axle 2, a planet gear carrier 52 rotatably mounted around hub axle 2, three planet gears 51 rotatably mounted to planet gear carrier 52 (only one planet gear is shown in the figures), and a ring gear 34 rotatably mounted around hub axle 2 but axially fixed relative to hub axle 2. Planet gears 51 mesh with sun gear 50 and with ratchet teeth 34b formed on an inner peripheral surface of ring gear 34. Planet gear carrier 52 is provided with splines 52a formed, e.g., on an inner peripheral surface thereof for engaging corresponding splines 26b formed on, e.g., an outer peripheral surface of clutch member 26. Ring gear 34 extends from planet gears 51 to a position adjacent to drive member 11. A one-way roller clutch 57 is disposed between planet gear carrier 52 and hub cap 56 for communicating rotational drive force from planet gear carrier 52 to hub body 4 in a manner described below.

Figure 2:
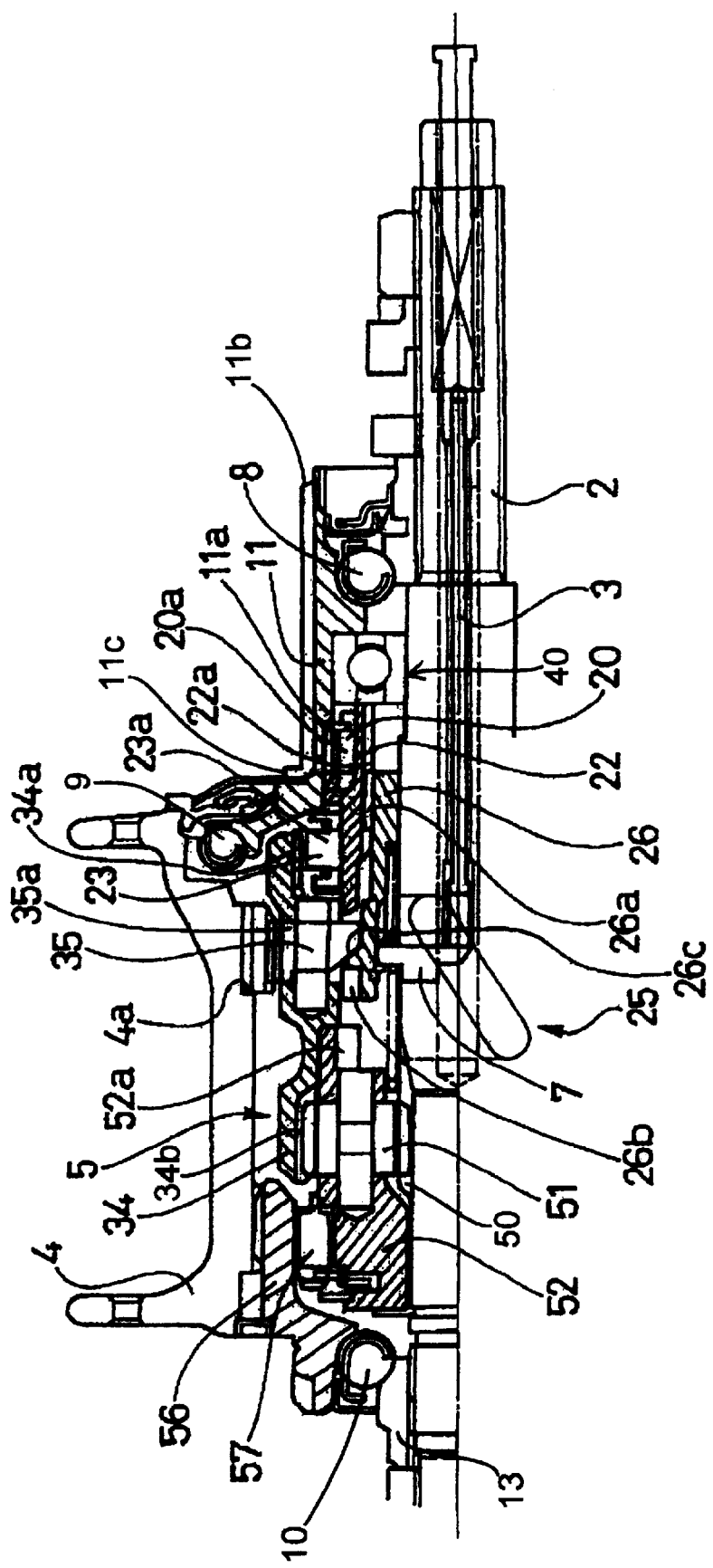
FIG. 2 is a cross-sectional view of the hub transmission in a middle speed state.
Figure 3:
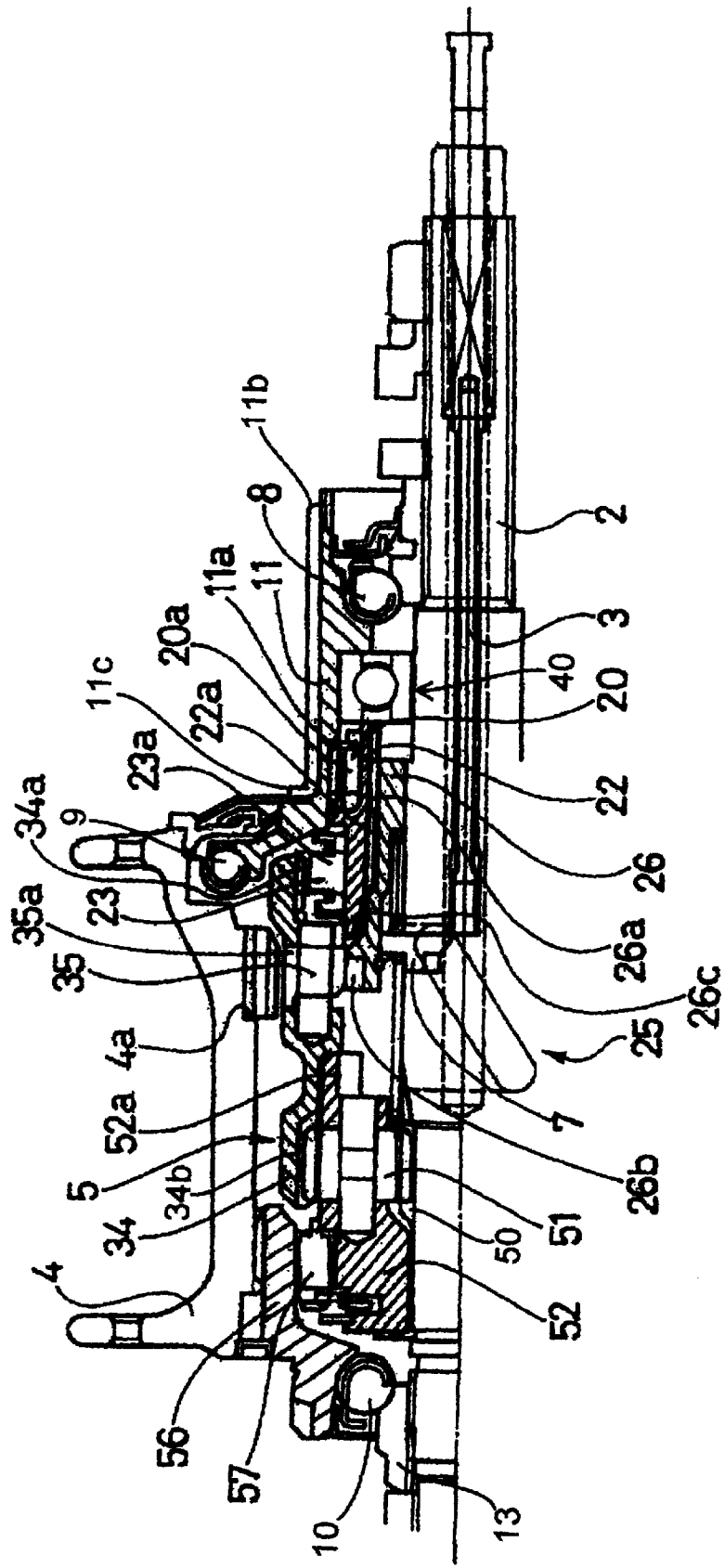
FIG. 3 is a cross-sectional view of the hub transmission in a low speed state.

A one-way clutch 20 is disposed between drive member 11 and a support in the form of a pawl body 22. One-way clutch 20 comprises at least one one-way clutch member in the form of a pawl 20a mounted on an outer peripheral surface of pawl body 22. In this embodiment, one pawl is sufficient for rotational drive force transmission, but two or more pawls may be provided if desired. As shown in FIGS. 1, 2 and 3, the axial position of pawl body 22 with respect to drive member 11 remains unchanged for the high speed, middle speed and low speed states of the hub transmission. In other words, no relative axial movement takes place between drive member 11 and pawl body 22.

Pawl 20a is pivotally mounted on the outer peripheral surface of pawl body 22 and is spring biased so as to engage ratchet teeth 11a formed on an inner peripheral surface of drive member 11. Ratchet teeth 11a are formed such that forward rotational drive force applied to drive member 11 causes pawl 20a to lock with one of the ratchet teeth 11 so that the rotational drive force is transferred to pawl body 22, whereas pawl 20a slides over ratchet teeth 11a when reverse rotational drive force is applied to drive member 11 (e.g., when back pedaling). Thus, only forward rotational drive force is transferred from drive member 11 to the internal elements of the hub transmission, and no or at least substantially no reverse rotational drive force is transferred from drive member 11 to the internal elements of the hub transmission. The effect is especially noticeable in the high speed state shown in FIG. 1, for not only is clutch member 26 decoupled from drive member 11 but also from planet gear carrier 51 that is engaged with clutch member 26. As a result, an extremely smooth and light running condition is achieved when back pedaling with the present hub transmission. This light running condition of drive member 11 is particularly advantageous when it supports several chain sprockets.

In this embodiment, another one-way clutch 23 is disposed between pawl body 22 and ring gear 34. One-way clutch 23 comprises at least two one-way clutch members in the form of pawls 23a that are pivotally mounted on an outer peripheral surface of pawl body 22. Pawls 23a are spring biased to engage with ratchet teeth 34a formed on an inner peripheral surface of ring gear 34. In this embodiment, two pawls 23a are employed, while in practice four pawls or more may be provided depending on the situation, i.e., depending on the force to be transferred.

Another one-way clutch 35 is mounted to ring gear 34. One-way clutch 35 comprises at least one one-way clutch member in the form of a pawl 35a that is biased by a coil spring (not shown) toward ratchet teeth 4a formed on hub body 4. Pawl(s) 35a mesh with ratchet teeth 4a when ring gear 34 is rotated in the forward drive direction. However, pawl(s) 35a can be placed in a power transmission (engaged) state or in a power interruption (disengaged) state in a manner discussed below. In the engaged state, forward drive rotation is transferred from ring gear 34 through pawl(s) 35a and ratchet teeth 4a to hub body 4. In the disengaged state, pawl(s) 35a are knocked down by a switching member 26c of clutch member 26 as shown in FIG. 3. In the disengaged state, no forward or reverse rotational drive force can be transmitted to hub body 4.

Figure 4:
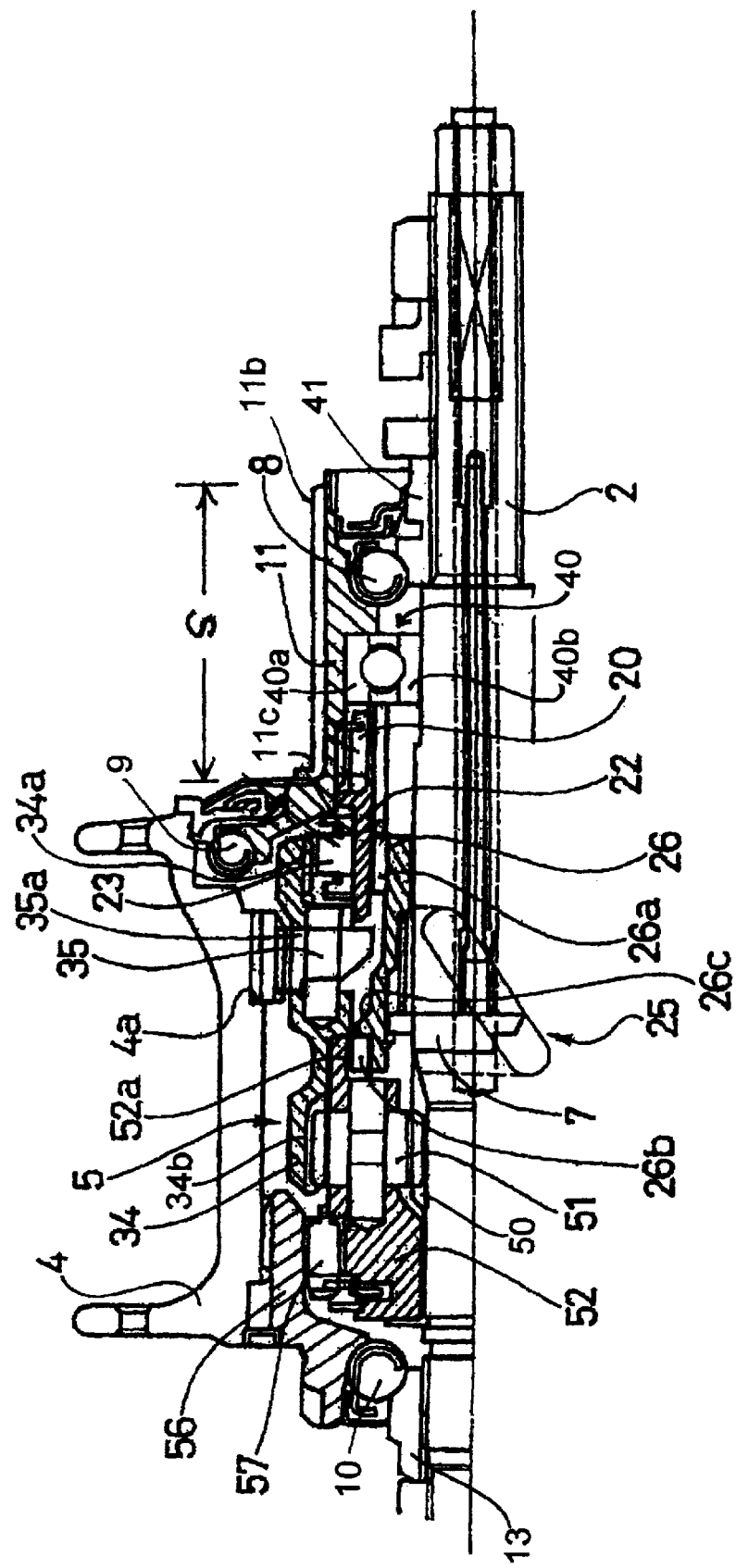
FIG. 4 is a cross-sectional view of the hub transmission illustrating the drive member.

As shown in FIG. 4, drive member 11 includes an axial portion S that defines a sprocket-supporting portion adapted to support at least one chain sprocket, preferably several sprockets. Thus, in this embodiment, in addition to the gear shifting means of the internal hub transmission, chain-shifting means in the form of a derailleur (not shown) is provided for shifting the chain from one sprocket to another to produce additional speeds. Multi-stage sprocket assemblies are well known in the art and can be provided in the form of so-called sprocket cassettes. Typically, the outer peripheral surface of drive member 11 is provided with splines that engage corresponding splines formed on the inner peripheral surfaces of the sprockets.

With a larger axial portion S capable of carrying several chain sprockets, additional forces are imparted to drive member 11. More specifically, when the axial portion S of drive member 11 increases, the distance along hub axle 2 between the points where hub axle 2 is attached to the bicycle frame likewise increases. The weight of the cyclist bearing down on the frame at these two points is countered by the upward force of the wheel transmitted to hub axle 2 through the spokes. This, in turn, causes a bending moment and a slight deflection to be applied to drive member 11, which can cause drive member 11 to drag and run less smoothly. Thus, even in the free running condition, with no forward drive power being applied, the drive member runs more heavily. Forward pedaling force applied by the rider further exacerbates the problem by applying a torsional bending force to drive member 11.

To alleviate this problem, a bearing assembly 40 is disposed between drive member 11 and hub axle 2 axially inwardly of bearing assembly 8. Thus, at least two axially-spaced bearing assemblies are associated with the axial portion S. The precise positioning of the bearing assembly 40 will depend on the axial length S itself and on the particular application. In this embodiment, drive member 11 is adapted to mount a 7 or 8 speed sprocket assembly, and bearing assembly 40 is located at approximately a central region of the axial extension S between outer end region 11b and an inner end region 11c. The position of bearing assembly 40 still allows space for one-way clutch 20 to reliably engage pawl body 22.

As shown in FIG. 4, bearing assembly 40 comprises an inner race 40b mounted around hub axle 2 and an outer race 40a mounted around the inner peripheral surface of drive member 11. Securing inner race 40b to hub axle 2 tightly, such as by press fitting, increases the ability of drive member 11 to counteract the torsional and bending moments mentioned above. The same is true if outer race 40a is secured to the inner peripheral surface of drive member 11 in a similar manner. In this embodiment, bearing assembly 40 is a ball bearing assembly, although other bearing assemblies known in the art can be used as well.

As a result of the above structure, drive member 11 can have increased axial extension to accommodate a multi-stage sprocket assembly while still maintaining the smooth running performance of the drive member. The combination of the present hub transmission with a multi-stage sprocket assembly leads to a combined speed change apparatus for a bicycle that achieves smooth running characteristics comparable to that of a conventional freewheel sprocket assembly.

The operation of the hub transmission will now be described. FIG. 1 shows the internal hub transmission in a high speed state. In this state, clutch member 26 has been placed by clutch control mechanism 25 in the left-most axial position such that splines 26b of clutch member 26 engage splines 52a on planet gear carrier 52. Forward rotational force applied to drive member 11 is transmitted through one-way clutch 20 to pawl body 22 which, in turn, transmits the rotational force to clutch member 26 via splines 26a. The rotational force is transmitted to planet gear carrier 52 via splines 26b and 52a and then transmitted from planet gear carrier 52 via planet gear mechanism 5 to ring gear 34 and one-way clutch 35. One-way clutch 35 is in the engaged state and transfers the forward rotational drive force to hub body 4. In this state, the input rotational speed is increased and then output according to the gear ratio determined by the numbers of teeth on sun gear 50, planet gears 51 and ring gear 34. Forward rotation of drive member 11 also is transmitted to one-way clutch 23. However, the rotational speed of ring gear 34 is faster than that of drive member 11, so no rotation is transmitted to the ring gear 34 via one-way clutch 23.

FIG. 2 shows the internal hub transmission in a middle speed state. In this state, clutch member 26 is positioned by means of clutch control mechanism 25 to an intermediate axial position. Forward rotational drive force from drive member 11 is transmitted through one-way clutch 20 to pawl body 22 and then through one-way clutch 23 directly to ring gear 34. One-way clutch 35 is still in the engaged state, so the forward rotational drive force of ring gear 34 is transmitted directly to hub body 4. The forward rotational drive force of ring gear 34 also is transmitted to planet gear carrier 52 via planet gears 51 and from there to roller clutch 57. However, planet gears 51 reduce the rotational speed of planet gear carrier 52 so that rotational transmission through roller clutch 57 and hub cap 56 is overrun by the faster rotational motion of hub body 4.

FIG. 3 shows the internal hub transmission in a low speed state. In this state, clutch member 26 is now positioned in the axially right-most position, and a switching member 26c of clutch member 26 knocks down pawl(s) 35a to place them in the disengaged state. The forward rotation of drive member 11 is transmitted through one-way clutch 20 to pawl body 22 and then through one-way clutch 23 to ring gear 34. Since one-way clutch 35 is in the disengaged state, no rotation is transmitted to hub body 4 through ring gear 34. The forward rotation of ring gear 34 is then transmitted through planet gear mechanism 5 to planet gear carrier 52 and then through roller clutch 57 and hub cap 56 to hub body 4. The rotational speed of ring gear 34 is reduced by planet gears 51, thus resulting in the low speed transmission state.

While the above is a description of various embodiments of inventive features, further modifications may be employed without departing from the spirit and scope of the present invention. For example, while the described hub transmission has three forward speeds (not counting the number of speeds available from the multi-stage sprocket assembly), it should be apparent that the arrangement of one-way clutch 20 between drive member 11 and pawl body 22 can be provided in hub transmissions having any number of speeds. The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. An internal hub transmission for a bicycle comprising:
   a drive member rotatably supported around a hub axle;
   a hub body rotatably supported around the hub axle;
   a planetary gear mechanism that communicates rotational force from the drive member to the hub body through a plurality of power transmitting paths;
   a clutch member that controls the planetary gear mechanism; and
   a first one-way clutch mechanism that communicates rotational force from the drive member to the clutch member when the drive member rotates in a first direction and allows the drive member to rotate relative to the clutch member when the drive member rotates in an opposite second direction.

2. The transmission according to claim 1 wherein the drive member includes a sprocket-supporting portion structured to support at least one sprocket, and further comprising:
   a first bearing assembly rotatably supporting the drive member on the hub axle; and
   a second bearing assembly rotatably supporting the drive member on the hub axle.

3. The transmission according to claim 2 wherein the first bearing assembly comprises:
   an inner race disposed about an outer peripheral surface of the hub axle; and
   an outer race disposed about an inner peripheral surface of the drive member.

4. The transmission according to claim 2 wherein the first bearing assembly is approximately axially centered relative to the sprocket-supporting portion.

5. The transmission according to claim 4 wherein the second bearing assembly is located at an axially outer position of the drive member.

6. An internal hub transmission for a bicycle comprising:
   a drive member rotatably supported around a hub axle;
   a hub body rotatably supported around the hub axle;
   a planetary gear mechanism that communicates rotational force from the drive member to the hub body through a plurality of power transmitting paths;
   a clutch member that controls the planetary gear mechanism; and
   a first one-way clutch mechanism disposed in a force transmission path between the drive member and the clutch member;
   wherein the first one-way clutch mechanism comprises:
      a support disposed between the drive member and the clutch member; and
      a one-way clutch member disposed between one of a) the support and the drive member; and b) the support and the clutch member.

7. The transmission according to claim 6 wherein the one-way clutch member comprises a pawl.

8. The transmission according to claim 6 wherein the one-way clutch member is disposed between the support and the drive member.

9. The transmission according to claim 8 wherein the support is spline-connected with the clutch member.

10. The transmission according to claim 9 wherein the clutch member is axially slidable relative to the support.

11. The transmission according to claim 8 wherein the one-way clutch member comprises a pawl.

12. The transmission according to claim 11 wherein the pawl is mounted to one of the support and the drive member and is biased to engage a ratchet tooth disposed on the other one of the support and the drive member.

13. The transmission according to claim 12 wherein the pawl is structured to rotationally fix the support relative to the drive member when the drive member rotates in one direction and to allow relative rotation between the support and the drive member when the drive member rotates in an opposite direction.

14. The transmission according to claim 6 wherein the planetary gear mechanism comprises:
   a sun gear;
   a ring gear rotatably supported around the hub axle;
   a planet gear carrier rotatably supported around the hub axle; and
   a planet gear rotatably supported to the planet gear carrier, wherein the planet gear engages the sun gear and the ring gear.

15. The transmission according to claim 14 further comprising a second one-way clutch disposed in a force transmission path between the support and the ring gear.

16. The transmission according to claim 15 wherein the second one-way clutch comprises a pawl.

17. The transmission according to claim 16 wherein the pawl is mounted to one of the support and the ring gear and is biased to engage a ratchet tooth disposed on the other one of the support and the ring gear.

18. The transmission according to claim 14 further comprising a second one-way clutch disposed in a force transmission path between the ring gear and the hub body.

19. The transmission according to claim 18 wherein the second one-way clutch comprises a pawl.

20. The transmission according to claim 19 wherein the pawl is mounted to one of the ring gear and the hub body and is biased to engage a ratchet tooth disposed on the other one of the ring gear and the hub body.

21. The transmission according to claim 20 further comprising a switching member operated by the clutch member to selectively disengage the second one-way clutch so that the ring gear is allowed to rotate relative to the hub body.

22. The transmission according to claim 6 wherein the clutch member is spline-connected with the planet gear carrier at least part time.

23. An internal hub transmission for a bicycle comprising:
   a drive member rotatably supported around a hub axle, wherein the drive member includes a sprocket-supporting portion structured to support at least one sprocket;
   a first bearing assembly rotatably supporting the drive member on the hub axle;
   a second bearing assembly rotatably supporting the drive member on the hub axle;
   wherein the first bearing assembly and the second bearing assembly are disposed between the drive member and the hub axle;
   a hub body rotatably supported around the hub axle;
   a planetary gear mechanism that communicates rotational force from the drive member to the hub body through a plurality of power transmitting paths; and
   a clutch member that controls the planetary gear mechanism;
   wherein the hub axle includes an opening for receiving a control rod therein for controlling the clutch member.

24. The transmission according to claim 23 wherein the sprocket-supporting portion of the drive member is structured to support a plurality of sprockets.

25. The transmission according to claim 23 wherein the first bearing assembly is located at an axially outer position of the drive member, and wherein the second bearing assembly is located axially inward of the first bearing member.

26. The transmission according to claim 25 wherein the second bearing assembly is approximately axially centered relative to the sprocket-supporting portion of the drive member.

27. The transmission according to claim 26 wherein the sprocket-supporting portion of the drive member is structured to support a plurality of sprockets.

* * * * *